WITHOUT COMPENSATION
STALLED TORQUE ≃ 80%

WITH COMPENSATION
STALLED TORQUE ≃ 160%

United States Patent Office 3,402,336
Patented Sept. 17, 1968

3,402,336
ADJUSTABLE FREQUENCY A.C. MOTOR CONTROL SYSTEM WITH LOW SPEED COMPENSATION
Robert L. Risberg, Milwaukee, Wis., assignor to Cutler-Hammer, Inc., Milwaukee, Wis., a corporation of Delaware
Filed Oct. 13, 1965, Ser. No. 495,594
6 Claims. (Cl. 318—227)

ABSTRACT OF THE DISCLOSURE

An adjustable frequency alternating current motor control system with means for adjusting the frequency downwardly under conditions of high torque loading and low speed in order to maintain motor field strength and thereby maintain the torque at low speed.

---

This invention relates to the adjustable frequency alternating current motor control systems and compensating means for low speed operation thereof under high torque loading and more particularly to motor control systems as described which are of the static inverter type.

Alternating current induction motors may be speed controlled in a constant torque mode by a variable frequency power supply in which the power frequency varies in proportion to the power voltage amplitude. Such a system is shown in the copending R. L. Risberg application Ser. No. 381,970, filed July 13, 1964, now Patent No. 3,344,326, issued Sept. 26, 1967 and assigned to the assignee of this application. In such a system at low frequency and voltage, the resistance of the power circuit and motor becomes relatively more significant as a voltage loss and will significantly reduce the field flux in the motor. The reduction of field strength at low speeds reduces the torque available at these speeds. In applications where full torque is required at low speeds and heavy loads, the field strength must be maintained.

It is therefore an object of this invention to provide in an adjustable frequency A.C. motor control system, improved means for maintaining the motor field strength at low speeds and high loads.

It is another object of this invention to provide a control as herebefore described with low speed compensation means which responds properly to high rates of change of load.

These objects are accomplished by providing means in an adjustable frequency A.C. motor control which means senses low motor speed and high load and reduces the frequency of the power supply in response thereto. In A.C. induction motors such as squirrel cage motors, the field strength varies substantially as the volt seconds per half cycle of power. The reduction of frequency by the aforedescribed compensating means increases the volt seconds per half cycle, and in effect, maintains the available torque at low speeds by maintaining the volt seconds available for magnetizing purposes. Further, derivative circuit means are provided to make the aforedescribed compensating means properly responsive to rapid changes in motor load.

A more complete understanding of the invention will be had and other objects will appear upon referring to the following description and claims.

While the motor control system hereinafter described is adapted to fulfill the objects stated, it is to be understood that it is not intended that the invention be confined to the particular preferred embodiment disclosed, since it is susceptible of various modifications without departing from the scope of the appended claims.

Figure 1A:
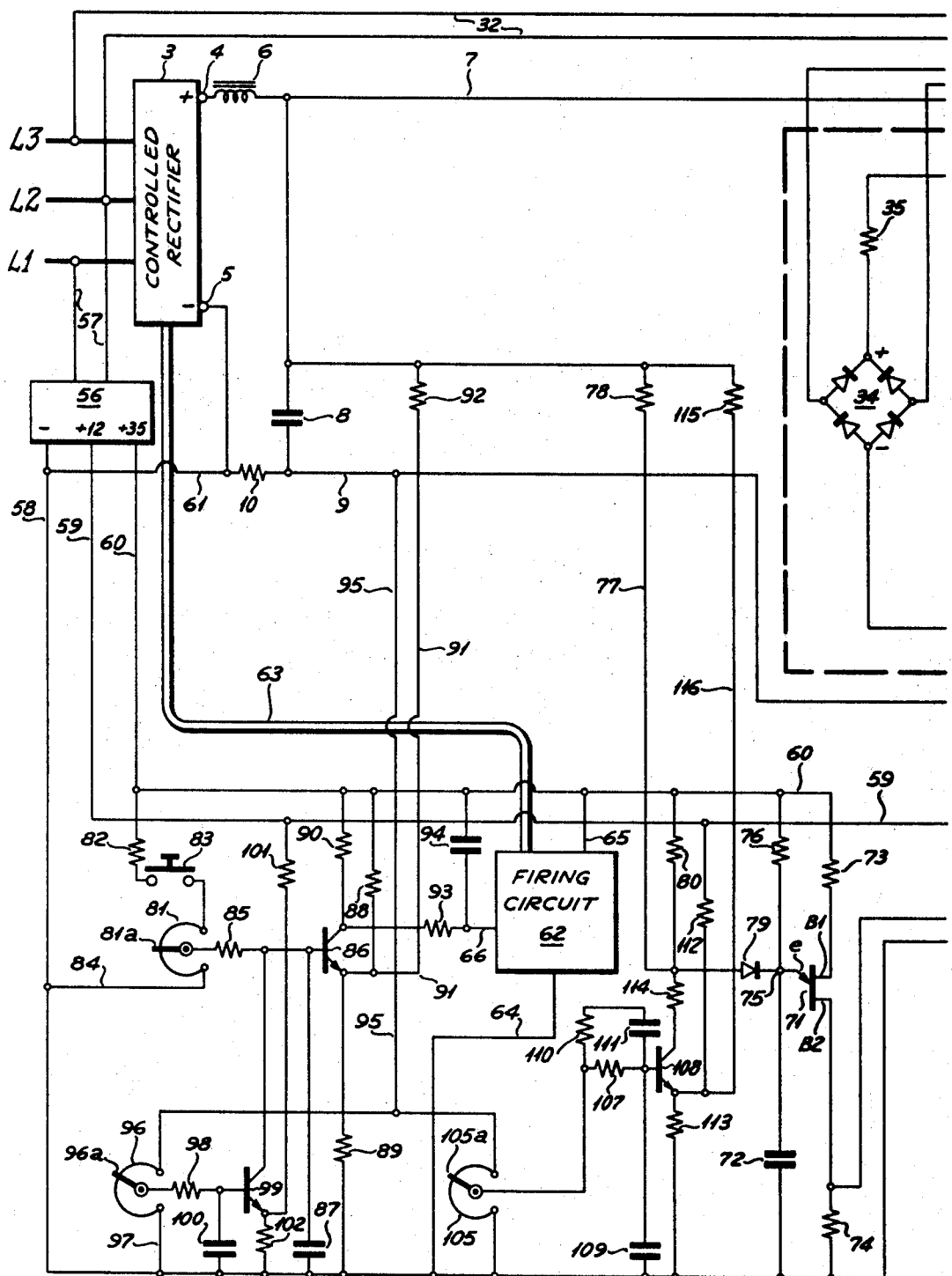
Figure 1B:
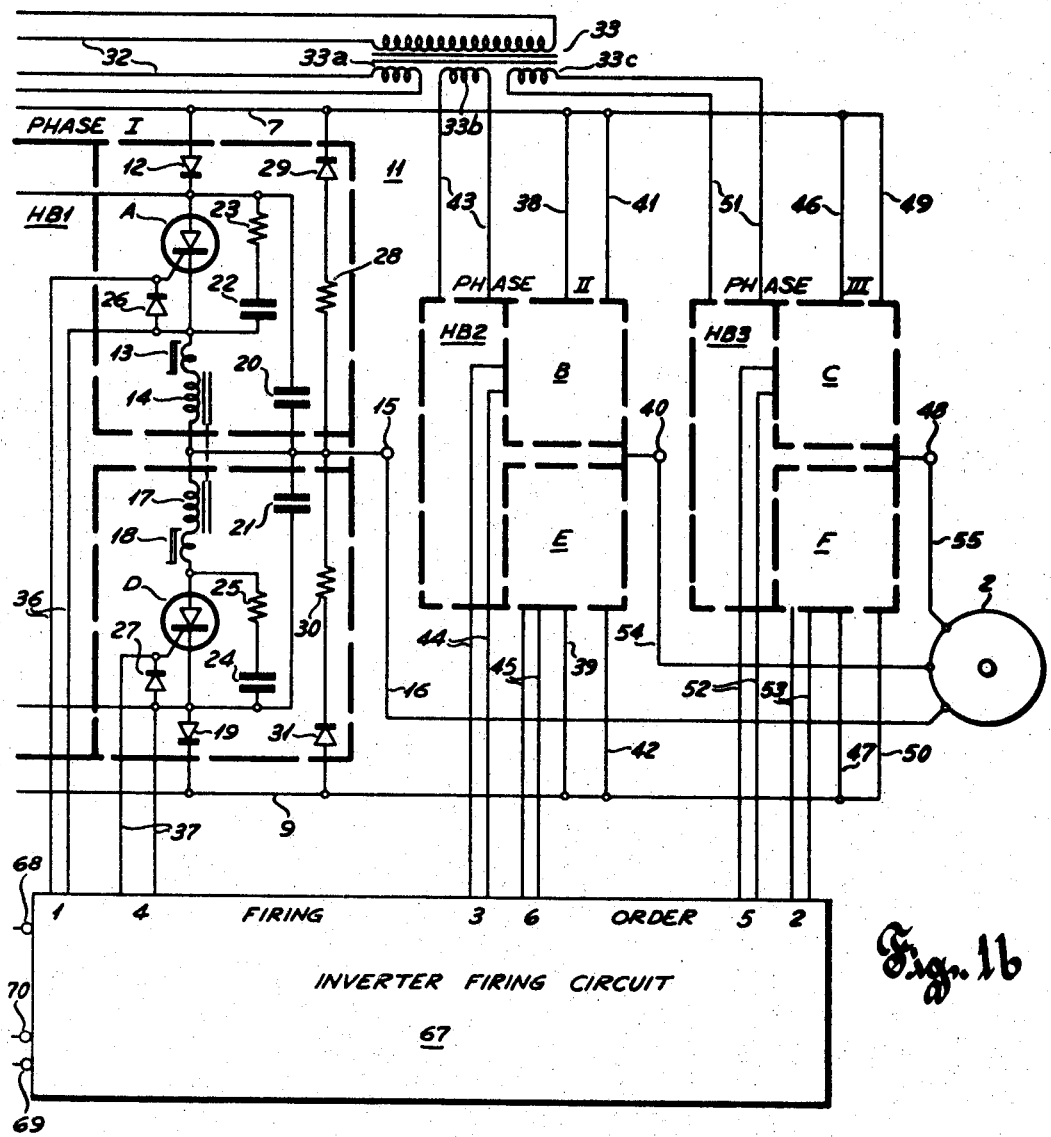
Figure 2:
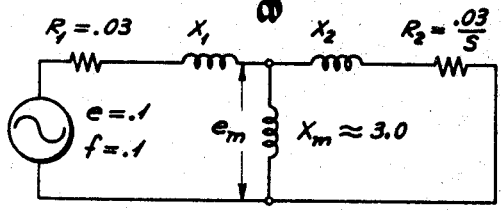
Figure 3:
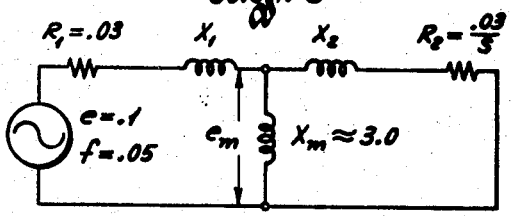

In the accompanying drawings:

FIGURES 1a and 1b constitute a circuit diagram of a motor control system embodying the claimed invention; and FIGS. 2 and 3 are equivalent circuit diagrams illustrating the function of the invention of FIGS. 1a and 1b.

Referring to the drawings, there is shown a three-phase squirrel cage motor 2. Power circuitry for supplying motor 2 includes input lines L1, L2 and L3 for supplying three-phase A.C. to controlled rectifier 3 having a positive output terminal 4 and a negative output terminal 5. A smoothing inductance 6 is connected in series with the positive D.C. conductor 7. A filter capacitor 8 is connected between the positive conductor 7 and a negative conductor 9. An IR drop resistance 10 is included in the power circuit in series with negative conductor 9.

Conductors 7 and 9 supply power to the input of a variable frequency A.C. inverter 11 of a type more completely described in the copending R. L. Risberg application Ser. No. 381,969, filed July 13, 1964, now Patent No. 3,355,654, issued Nov. 28, 1967, and assigned to the present assignee. The inverter 11 comprises three two-legged half-bridges HB1, HB2 and HB3 connected in parallel across supply conductors 7 and 9 to form a parallel inverter of a three-phase bridge type. The upper portions of half-bridges HB1–3 are provided with silicon controlled rectifiers A, B and C, respectively, and in the lower portions thereof are provided with silicon controlled rectifiers D, E and F, respectively. Since half-bridges HB2 and HB3 are similar to half-bridges HB1, only the latter will be described in detail, half-bridges HB2 and HB3 being shown schematically to avoid unnecessary duplication.

The power circuit of half-bridge HB1 extends from conductor 7 through a unidirectional conducting diode 12, silicon controlled rectifier A, an inductor 13 and a commutating inductor winding 14 to an inverter output terminal 15. A conductor 16 connects terminal 15 to the motor 2. In the lower half of half-bridge HB1 a power circuit extends from terminal 15 through a commutating inductor winding 17, an inductor 18, silicon controlled rectifier D and a unidirectional conducting diode 19 to conductor 9. Inductors 13 and 18 are of the square hysteresis loop type and are connected in series with silicon controlled rectifiers A and D, respectively, for protecting the associated silicon controlled rectifiers from rapid changes in current. Inductor windings 14 and 17 are wound upon a common core as indicated by the dashed line and are poled so that a rapid increase in current through one leg of the half-bridge will induce in the inductor winding of the opposite leg a reverse voltage tending to turn off the silicon controlled rectifier of the opposite leg. A commutating capacitor 20 is connected between the anode of silicon controlled rectifier A and terminal 15. Similarly, a commutating capacitor 21 is connected between terminal 15 and the cathode of silicon controlled rectifier D.

A small capacitor 22 and a small resistor 23 are connected in series across silicon controlled rectifier A between the anode and cathode thereof. A similar capacitor 24 and resistor 25 are connected in series across silicon controlled rectifier D. These circuits function to slow down the rate of change of voltage across the silicon controlled rectifiers and to absorb recovery transients thereon.

Diodes 26 and 27 are placed between the cathodes and gates of the silicon controlled rectifiers A and D, respectively, to limit the magnitude of reverse bias voltage which may be applied to the gates thereof.

To provide a path of current flow due to the induced voltage of the inductors of each leg of the half-bridges and the induced voltages of the motor, each leg of each half-bridge is provided with a unidirectional voltage control or feedback circuit thereacross. For this purpose, a resistor 28 and a diode 29 are connected in series from terminal 15 to conductor 7 to allow current flow in a reverse direction in shunt of inductor winding 14, inductor 13, silicon controlled rectifier A and diode 12. In a similar manner a resistor 30 and a diode 31 are connected in series from conductor 9 to terminal 15 in shunt of diode 19, silicon controlled rectifier D, inductor 18 and inductor winding 17.

Each half-bridge of inverter 11 is provided with a separate direct current source for precharging the commutating capacitors associated therewith. For this purpose a pair of conductors 32 connect A.C. power conductors L2 and L3 to the primary winding of a transformer 33. A secondary winding 33a supplies current to a rectifier bridge 34. A positive output of bridge 34 is connected through a resistor 35 to the junction of diode 12 and silicon controlled rectifier A. The negative output of bridge 34 is connected to the junction of silicon controlled rectifier D and diode 19. The output of bridge 34 is thereby connected across commutating capacitors 20 and 21 in series. A function of diodes 12 and 19 is to trap the charging voltage of capacitors 20 and 21 and permit the charging thereof to a voltage higher than that appearing across D.C. conductors 7 and 9.

A pair of conductors 36 are connected to the cathode and gate of silicon controlled rectifier A for the purpose of supplying a firing signal to the gate of silicon controlled rectifier A. Similarly, a pair of conductors 37 are connected to the cathode and gate of silicon controlled rectifier D for supplying a firing signal thereto.

Correspondingly, half-bridge HB2 has input conductors 38 and 39, and output terminal 40, feedback conductors 41 and 42 and bridge charging current conductors 43 leading from secondary winding 33b. Further, conductor pairs 44 and 45 supply firing voltage signals to silicon controlled rectifiers B and E, respectively. Similarly, half-bridge HB3 has input conductors 46 and 47, feedback conductors 49 and 50, output terminal 48 and precharging current conductors 51 leading from secondary winding 33c. Conductor pairs 52 and 53 supply firing voltage signals to silicon controlled rectifiers C and F, respectively. Conductors 54 and 55 connect output terminals 40 and 48, respectively, to the motor 2.

The control circuits for the inverter system are supplied with operating voltages from a direct current source 56 which in turn is supplied from a pair of conductors 57 from A.C. lines L1 and L2. Voltage source 56 supplies a negative or ground conductor 58, a positive 12-volt conductor 59 and a positive 35-volt conductor 60. A conductor 61 connects negative or ground conductor 58 to the negative terminal 5 of the controlled rectifier 3 to provide a common ground connection.

A three-phase firing circuit 62 is provided with means for supplying adjustable phase angle firing voltage pulses to controlled rectifier 3 which may preferably be of the silicon controlled rectifier type. These firing pulses are carried from firing circuit 62 to controlled rectifier 3 via suitable conductors within a conduit 63. The 35-volt power supply of conductors 58 and 60 is connected to firing circuit 62 by conductors 64 and 65. The phase angle of firing pulses of firing circuit 62 and consequently the magnitude of voltage output from controlled rectifier 3 are varied in accordance with the magnitude of the signal voltage impressed on an input signal conductor 66. Firing circuit 62 is shown as a rectangle for the sake of simplicity and reference may be had to R. W. Spink copending application Ser. No. 248,314, filed Dec. 31, 1962, now Patent No. 3,281,645, and for a detailed illustration and description of a circuit suitable for this purpose, this copending application being assigned to the assignee of this invention.

As shown schematically in FIG. 1b, the inverter system is provided with a firing control circuit 56 of the ring shift register type for rendering silicon controlled rectifiers A–F conducting in a predetermined order. The firing control circuit 67 is energized through terminals 68 and 69 from the 12-volt D.C. conductors 59 and 58, respectively. The firing control circuit 67 is further provided with six outputs connected through pairs of conductors 36, 44, 52, 37, 45 and 53 across the gates and cathodes of silicon controlled rectifiers A–F, respectively. The firing control circuit 67 applies firing voltages through these pairs of output conductors to render the silicon controlled rectifiers conducting in a predetermined repetitively sequential order. The numerals along the upper portion of firing control circuit 67 indicate the order in which the firing pulses are applied to the inverter circuit 11. Consequently, with reference to the silicon controlled rectifiers, the firing order is A, F, B, D, C and E. The firing control circuit provides three outputs at all times which maintain three silicon controlled rectifiers conducting at all times and this conduction of three is shifted or advanced among the six. When a fourth silicon controlled rectifier is fired, the first output pulse is terminated and the first silicon controlled rectifier is reverse biased by its commutating inductor and rendered non-conducting. In addition, the gate-cathode circuit of the silicon controlled rectifier to be turned off is reverse biased by a reverse voltage applied through the associated output of firing circuit 67. As each silicon controlled rectifier is fired in order, the silicon controlled rectifier in the opposite leg of the same half-bridge is turned off in a similar manner. This firing sequence is arranged to produce a three-phase output voltage from inverter 11. Each phase of this output voltage consists of a square wave having a sixty degree dwell on either side of the one hundred twenty degree pulse. Further, the three phases are displaced one hundred twenty degrees apart. The operation of firing circuit 67 is controlled by a train of pulses applied to a terminal 70, each pulse of the train causing a one-step advance in the sequential firing of the silicon controlled rectifiers in inverter 11. Consequently, the frequency of the output of inverter 11 is proportional to the frequency of pulses applied to terminal 70. For a detailed illustration and a description of a firing control circuit usable for this inverter system, reference may be had to R. L. Risberg copending application Ser. No. 381,970, filed July 13, 1964, now patent No. 3,344,326, and assigned to the assignee of this invention.

The frequency control pulses applied to terminal 70 of firing circuit 67 are the output of a relaxation oscillator of a unijunction transistor type including a unijunction transistor 71 having a first base B1, a second base B2 and an emitter e. The oscillator further comprises a capacitor 72, a temperature compensating resistor 73 and a load resistor 74. It is the function of this relaxation oscillator to provide a train of pulses to terminal 70, the frequency of these pulses being proportional to the magnitude of signal current flowing to point 75 at the junction of emitter e and capacitor 72. Interbase voltage is supplied to unijunction transistor 71 from conductor 60, through resistor 73 and through resistor 74 to conductor 58. The capacitor 72 of the relaxation oscillator integrates the current input signal until the unijunction transistor 71 breaks down and again integrates until unijunction transistor 71 again breaks down, etc. A resistor 76 is connected between conductor 60 and point 75 and provides a minimum signal below which the relaxation oscillator will not operate. A conductor 77 is connected through a resistance 78 to the positive side of filter capacitor 8 and through a unidirectional conducting diode 79 to point 75 to provide a signal to point 75 proportional to the D.C. output voltage of controlled rectifier 3. This latter signal, when controlling, will cause a frequency of the output of inverter 11 to vary in proportion to the voltage magnitude of the output of controlled rectifier 3. This would ideally insure constant volt-seconds per half-cycle in all phases of the motor 2 to produce a constant A.C. field strength in motor 2. Thus, while the signal through conductor 77 is controlling, motor 2 would ideally be operating in a constant torque mode. There is, however, the low speed phenomenon which necessitates the low speed compensation which will be hereinafter more fully described. A resistor 80 is connected between conductor 60 and conductor 77 to provide an idling speed signal.

The motor speed reference signal for the system is obtained from a speed setter potentiometer 81 through its slider 81a. The voltage supply is obtained from conductor 60 through a voltage dropping resistor 82 and a manually closable start switch 83 to one side of potentiometer 81. The opposite terminal of potentiometer 81 is connected through a conductor 84 to the negative or ground conductor 58.

The speed reference signal is transmitted from slider 81a through a resistor 85 to the base of a comparator amplifier transistor 86. A capacitor 87 is connected between the base of transistor 86 and ground, and capacitor 87 together with resistor 85 form an RC time delay circuit for limiting the change of the speed reference signal to desirable values. Transistor 86 is operated in the amplifying mode with resistor 88 connected between conductor 60 and the emitter of transistor 86 to provide an "off" bias. A feedback resistor 89 is connected between the emitter of transistor 86 and the ground conductor 58. A load resistor 90 is connected between conductor 60 and the collector of transistor 86, and the output voltage of this amplifier stage appears thereacross. A conductor 91 is connected to the positive output of controlled rectifier 3 through a resistor 92 and is connected to the emitter of transistor 86 to provide a voltage feedback signal. A tachometer voltage may also be used as the feedback signal source instead of the controlled bridge output. Transistor 86 therefore functions to compare the speed reference signal on its base with the voltage feedback signal at its emitter, with the output voltage appearing at its collector. This output signal voltage is connected through a resistor 93 to the input signal conductor 66 of firing circuit 62. A capacitor 94 is connected between conductor 60 and input conductor 66. Capacitor 94 and resistor 93 together comprise an RC circuit for smoothing the speed signal. The voltage signal appearing at conductor 66 functions as herebefore described to control the magnitude of the output controlled rectifier 3.

Current limiting control means are also provided. A conductor 95 connects the negative power conductor 9 to one side of a current limit potentiometer 96, the other side being connected to conductor 97, through ground conductor 58 and through conductor 61 to the opposite side of the IR dropping resistor 10. A slider 96a on potentiometer 96 may be adjusted to provide the desired degree of current limit control. The motor might typically be limited to 150% rated current and therefore limited about 150% rated torque. As can be seen, the voltage on slider 96a will vary in proportion to the magnitude of the load current passing through resistor 10. Slider 96a is connected through a resistor 98 to the base of a transistor 99 which is operated in the amplifying mode. A capacitor 100 is connected between the base of transistor 99 and the ground conductor 58 and together with resistor 98 forms an RC filter. A resistor 101 and a resistor 102 are connected in series between conductor 59 and ground conductor 58 and at their juncture are connected to the emitter of transistor 99 to provide an "off" bias. The collector of transistor 99 is connected to the base of comparator amplifier transistor 86. As the current limit signal on slider 96a increases and becomes sufficiently high, transistor 99 becomes conductive to form a variable shunt between the base of transistor 86 and ground. As the current limit signal becomes sufficiently high, the signal appearing at the base of transistor 86 is limited and consequently the motor speed signal at conductor 66 is reduced to limit the speed of motor 2.

The load current signal of conductor 95 is also connected to one side of a variable potentiometer 105 with a slider 105a movable to select the desired degree of low speed flux compensation. A resistor 107 connects the slider 105a to the base of a transistor 108. A capacitor 109 is connected between the base of transistor 108 and ground conductor 58. Capacitor 109 and resistor 107 form a filter for smoothing the motor current signal appearing on slider 105a. A derivative circuit comprising a resistor 110 and a capacitor 111 in series is connected in shunt of resistor 107. This derivative circuit has a time constant much shorter than that of the filter consisting of resistor 107 and capacitor 109 and functions in response to rapid changes in current signal to rapidly reduce or increase the charge on capacitor 109 so that the signal to the base of transistor 108 will respond rapidly. This derivative circuit is particularly important for rapidly decreasing current signals to prevent saturation of the motor in the event the load decreases rapidly.

A resistor 112 is connected between conductor 59 and the emitter of transistor 108. A resistor 113 connects the emitter to ground. The combination of resistor 112 and resistor 113 provides an "off" bias for transistor 108. A collector resistor 114 connects the collector output transistor 108 to conductor 77. A motor speed signal is transmitted to the emitter of transistor 108 from the positive side of the capacitor 8 by way of a resistor 115 and a conductor 116. It can be seen that at higher speeds the voltage signal through conductor 116 can be made sufficiently positive to prevent conduction through transistor 108. This torque compensation circuit thereby is made operative only at low speeds. Under heavy motor load conditions, the signal appearing at the base renders transistor 108 increasingly conductive as the motor load current increases. As current flows through transistor 108 and resistor 114, the current flow from conductor 77 to the emitter of unijunction transistor 71 is decreased to thereby decrease the inverter output frequency while the amplitude of the output voltage remains unchanged. The available torque is consequently increased by an increase in the A.C. field strength. The "off" bias of transistor 108 might typically be adjusted so that the low speed compensation circuit will not respond at less than 50% of rated torque.

The function of diode 79 is now apparent. In the event of a very high motor load signal at low speeds transistor 108 might become so conductive as to reduce the current flowing to the emitter of unijunction transistor 71 below the level at which the relaxation oscillator would "stall." Diode 79 blocks the flow of current from resistor 78 away from emitter $e$ and as previously described, resistor 76 provides a minimum current to keep the relaxation oscillator operating.

Resistor 114 is placed in the collector circuit of transistor 108 to saturate the collector circuit in response to repetitive peak currents at the base of transistor 108 caused by the switching nature of the inverter. This serves to desensitize the circuit to these repetitive peak currents.

Referring to FIGS. 2 and 3 which show exemplary equivalent circuits for one phase of the motor, the performance of the motor with and without compensation can readily be seen.

In FIGS. 2 and 3:

$R_1$=Stator winding resistance
$R_2$=Effective rotor resistance
$X_1$=Stator leakage reactance
$X_2$=Rotor leakage reactance
$X_m$=Magnetizing impedance
$f$=Terminal frequency
$e$=Terminal voltage
$e_m$=Air gap voltage or voltage appearing across the magnetizing impedance
$S$=Slip The values shown in these diagrams are per unit values.
For purposes of illustration it is assumed that $X_1$ and $X_2$ are negligible at the low frequencies involved. Further, the magnetizing current is neglected. Since these illustrations are for stalled conditions, the slip S is unity.

In the approximate calculation below:

$\phi_m$ = Field flux
$T$ = Torque
$I_2$ = Rotor current
$B$ = Angle between the rotating vectors of $\phi_m$ and $I_2$ Without compensation $f=.1$, $e=.1$, and $R_1$ and $R_2=.03$. The following calculations result.

Since $$R_1 = R_2; \quad e_m = \frac{e}{2} = .05$$

$$\phi = \frac{e_m}{f} = \frac{.05}{.1} = .5$$

$$I_2 = \frac{e}{R_1 R_2} = \frac{.1}{.06} = 1.67$$

$$T = \phi_m I_2 \sin B$$

Since $B = 90°$ $$T\phi_m I_2 = .5 \times 1.67 = .83$$

or about 80%

With compensation $f$ would be about .05 under otherwise similar conditions.

$$\phi_m = \frac{e_m}{f} = \frac{.05}{.05} = 1$$

$$I_2 = \frac{e}{R_1 R_2} = \frac{.1}{.06} = 1.67$$

$$T\phi_m I_2 = 1 \times 1.67 = 1.67$$

or about 160%

The torque under stalled conditions would therefore be approximately doubled with the compensation resulting from this invention.

If tachometer feedback were used, the available stalled torque would be even larger because $e$ would be increased beyond .1 in response to the speed error present with a 10% speed reference signal.

It should be noted that the present method of increasing the volt seconds per half cycle is more desirable than controller IR compensation which would increase voltage and frequency in response to load, because the latter is a positive feedback loop to the voltage regulator, whereas the former improves the torque per ampere so long as the limits of saturation are not exceeded and provides stable operation.

I claim:

1. A control system for supplying variable frequency power to an alternating current motor comprising:
    means including variable frequency inverter means for supplying power to such a motor,
    control means including means for presetting and controlling the magnitude of the unidirectional voltage input to said inverter means and proportionally adjusting the frequency of the alternating voltage output of said inverter means to maintain the motor field flux strength and torque under normal motor speed conditions; and
    said control means further including means responsive to relatively low motor speeds and relatively high motor loads to reduce the frequency of the alternating output voltage of said inverter means alone without affecting the magnitude of the unidirectional input voltage to said inverter means to maintain the motor field flux strength and torque under low speed-high load motor conditions.

2. The invention as defined in claim 1 in which said means responsive to relatively low motor speeds and relatively high motor loads comprises:
    first means responsive, when operable, to high motor current for reducing the frequency of the alternating voltage output of said inverter means; and
    second means responsive to conditions of relatively low motor speeds for allowing operation of said first means at relatively low motor speeds only.

3. A control system for supplying variable frequency power to an alternating current induction motor comprising:
    controllable rectifier means for providing a direct current output of a controllable magnitude;
    control signal meas for applying control signals to said rectifier means and being selectively adjustable to control the voltage magnitude of the direct current output of said rectifier means;
    inverter means supplied with the direct current output of said rectifier means;
    control circuit means responsive to the voltage magnitude of the direct current output of said rectifier means for controlling the output frequency of said inverter whereby said inverter provides an adjustable alternating voltage and proportionally adjustable frequency;
    low speed-high load compensation means responsive to the magnitude of motor current and to the voltage magnitude of the direct current output of said rectifier means for controlling the effect of said control circuit means so that the frequency of the alternating output voltage of said inverter alone is reduced under conditions of high motor current and low magnitude of voltage in the output of said rectifier means without affecting the magnitude of the alternating output voltage of said inverter.

4. The invention as defined in claim 3 in which said low speed-high load compensation means comprises:
    first circuit means responsive when operable, to high motor current for lowering the frequency of said inverter means; and
    second circuit means responsive to the voltage magnitude of the direct current output of said rectifier means for rendering said first circuit means operable when said voltage magnitude is relatively low.

5. The invention as defined in claim 4 in which said control circuit means comprises:
    an oscillator having an output frequency variable as a function of the voltage magnitude of the output of said rectifier means, an increase in said voltage magnitude tending to increase the input to said oscillator;
    said first circuit means comprises means, when operable, tending to reduce said input to said oscillator in response to high motor current.

6. The invention as defined in claim 5 in which said input to said oscillator is filtered by means comprising a filter capacitor and further including derivative circuit means for increasing the rate of change of said input to said oscillator in response to rapid changes in motor current.

References Cited

UNITED STATES PATENTS

| 2,714,697 | 8/1955 | Small | 318—231 |
| 2,784,365 | 3/1957 | Fenemore et al. | 318—231 XR |
| 3,105,180 | 9/1963 | Burnett | 318—231 XR |
| 3,331,003 | 7/1967 | King | 318—231 |

FOREIGN PATENTS 745,840   3/1956   Great Britain.

ORIS L. RADER, *Primary Examiner.*

G. RUBINSON, *Assistant Examiner.*

PO-1050
(5/69)

UNITED STATES PATENT OFFICE
CERTIFICATE OF CORRECTION

Patent No. 3,402,336      Dated September 17, 1968

Inventor(s) Robert L. Risberg

It is certified that error appears in the above-identified patent and that said Letters Patent are hereby corrected as shown below:

In the specification, column 7, lines 19 to 21, that portion of the formula reading:

$$\frac{e}{R_1 R_2} \quad \text{should read} \quad \frac{e}{R_1 + R_2}$$

Column 7, line 24, that portion of the formula reading "$T\phi_m I_2$" should read -- $T \approx \phi_m I_2$ --; lines 34 and 35, that portion of the formula reading:

$$\frac{e}{R_1 R_2} \quad \text{should read} \quad \frac{e}{R_1 + R_2}$$

Column 7, line 37, that portion of the formula reading "$T\phi_m I_2$" should read -- $T \approx \phi_m I_2$ --.

In the claims, claim 3, line 14, "meas" should read -- means --.

SIGNED AND
SEALED
FEB 24 1970

(SEAL)
Attest:

Edward M. Fletcher, Jr.
Attesting Officer

WILLIAM E. SCHUYLER, JR.
Commissioner of Patents